(12) United States Patent
Eadon et al.

(10) Patent No.: US 7,854,125 B2
(45) Date of Patent: Dec. 21, 2010

(54) COMPONENTS FOR A GAS TURBINE ENGINE

(75) Inventors: Gary Eadon, Hinckley (GB); Andrew C. Graham, Coventry (GB)

(73) Assignee: Rolls-Royce PLC, London (GB)

( * ) Notice: Subject to any disclaimer, the term of this patent is extended or adjusted under 35 U.S.C. 154(b) by 716 days.

(21) Appl. No.: 11/889,651

(22) Filed: Aug. 15, 2007

(65) Prior Publication Data

US 2008/0060359 A1    Mar. 13, 2008

(30) Foreign Application Priority Data

Sep. 12, 2006    (GB) ................. 0617925.3

(51) Int. Cl.
*F02C 3/30* (2006.01)
(52) U.S. Cl. ..................... 60/775; 60/39.53
(58) Field of Classification Search ............ 60/39.53, 60/775, 728; 415/116, 191; 239/548, 556, 239/557, 565
See application file for complete search history.

(56) References Cited

U.S. PATENT DOCUMENTS

| | | | | |
|---|---|---|---|---|
| 1,255,650 A | | 2/1918 | Samuelson | |
| 4,728,262 A | * | 3/1988 | Marshall | 416/224 |
| 4,887,425 A | * | 12/1989 | Vdoviak | 60/761 |
| 4,993,918 A | * | 2/1991 | Myers et al. | 415/191 |
| 5,340,274 A | * | 8/1994 | Cunha | 415/115 |
| 5,899,061 A | * | 5/1999 | Bouchez et al. | 60/267 |
| 6,003,297 A | * | 12/1999 | Ziegner | 60/776 |
| 6,322,322 B1 | * | 11/2001 | Rhodes et al. | 415/191 |
| 2004/0120811 A1 | * | 6/2004 | Darkins et al. | 415/191 |
| 2008/0203236 A1 | * | 8/2008 | Mazzola et al. | 244/35 R |
| 2009/0145100 A1 | * | 6/2009 | Omielan et al. | 60/39.53 |

FOREIGN PATENT DOCUMENTS

| | | |
|---|---|---|
| DE | 102 54 721 A1 | 6/2004 |
| EP | 1 548 231 A2 | 6/2005 |
| WO | WO 2004/111392 A1 | 12/2004 |

\* cited by examiner

*Primary Examiner*—Michael Cuff
*Assistant Examiner*—Phutthiwat Wongwian
(74) *Attorney, Agent, or Firm*—Oliff & Berridge, PLC

(57) ABSTRACT

An aerofoil assembly including an aerofoil and a spray element that supplies fluid to a gas turbine engine. The aerofoil has a first part with a leading edge when located in the gas turbine engine, and a second part with a trailing edge when located in the gas turbine engine. The first part has features that slide relative to and engage with complementary features of the second part to form a releasable arrangement.

22 Claims, 5 Drawing Sheets

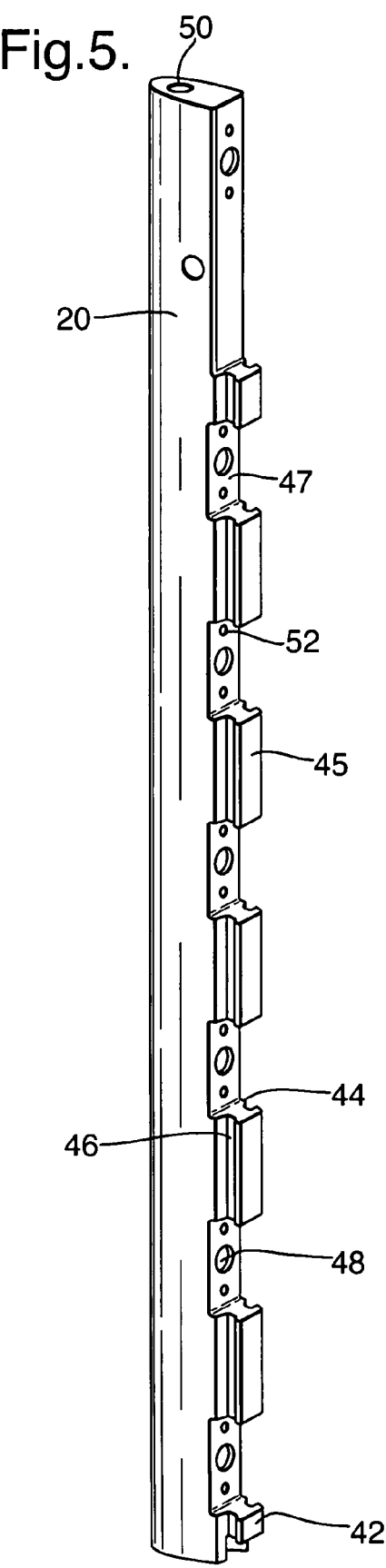
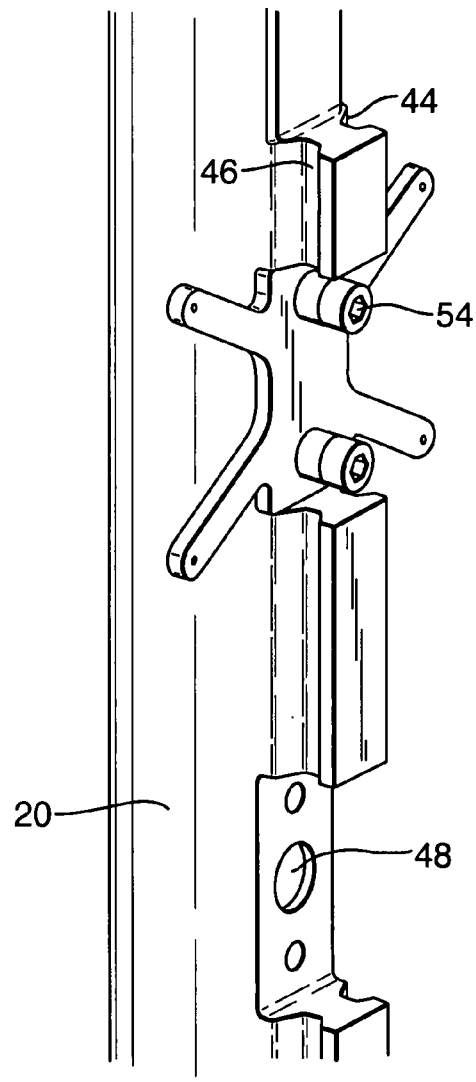
Fig.5.
Fig.6.

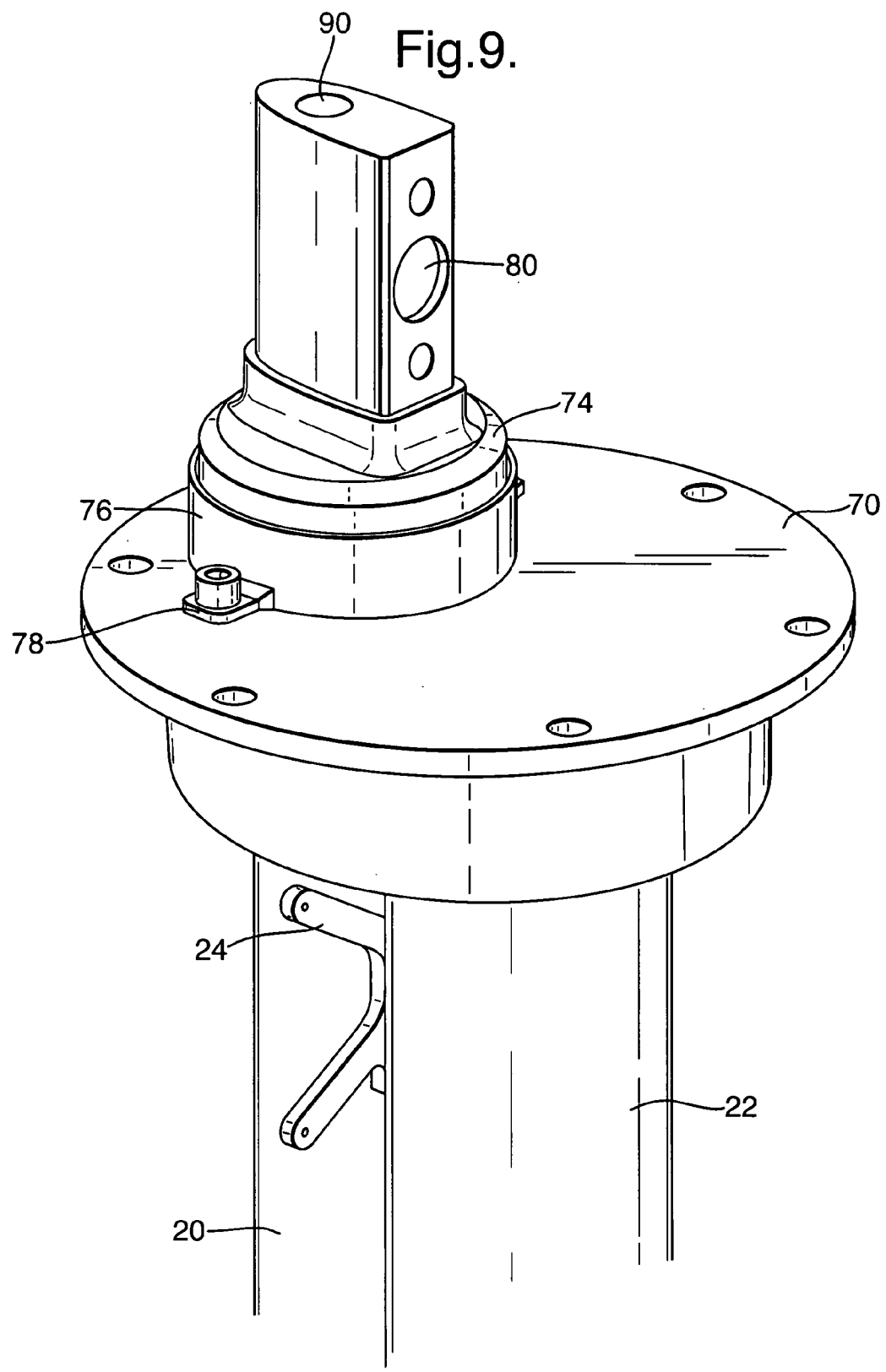

COMPONENTS FOR A GAS TURBINE ENGINE

BACKGROUND OF THE INVENTION

This invention concerns components for gas turbine engines and particularly components that inject fluid towards the compressor section of an industrial gas turbine.

The hot day power of an industrial gas turbine engine may be increased by injecting fine water droplets as a spray into the engine air intake. Part of the injected water may evaporate before entering the engine to create a fog which reduces the air intake temperature.

Power may be further augmented by adding sufficient water such that some may be carried into the compressor as droplets. The water is evaporated in the compressor which enables at least some of the compression process to be carried out at reduced temperatures.

SUMMARY OF THE INVENTION

The present invention seeks to provide improved apparatus for injecting fluid, particularly water, into a compressor.

According to a first aspect of the invention there is provided an aerofoil spray assembly for a gas turbine engine, the aerofoil having a first part with a profile intended to provide a leading edge when located in a gas turbine engine, a second part with a profile intended to provide a trailing edge when located in a gas turbine engine, wherein the first part has features that engage with complementary features on the second part to form a releasable arrangement, characterised in that a spray element for supplying a fluid to the gas turbine is secured between the first and second parts.

Preferably the features that engage on the first part may slide relative to the complementary features on the second part to form the releasable arrangement.

Preferably the features that engage on the first part provide at least one valley that extends parallel to the leading edge and the complementary features are provided by at least one projection that extends parallel to the trailing edge and slides within the valley.

The first part may have an internal bore for the passage of a fluid. A third part is preferably secured between the first and second parts.

The third part may be a spray element that provides a fluid conduit between the bore and a nozzle on the spray element. Preferably the spray element has a plurality of arms, each arm having a nozzle at its extremity.

The aerofoil assembly may be provided in a gas turbine engine. Preferably the aerofoil assembly is located upstream of the compressor. Preferably the aerofoil assembly is connected to a fluid manifold for the supply of fluid to the nozzles.

BRIEF DESCRIPTION OF THE DRAWINGS

The invention will now be described by way of example only with reference to the following drawings in which:

FIG. 5 depicts a front fairing of a spray bar;

FIG. 6 shows a front fairing with a spray element attached;

FIG. 9 depicts a top cap of the spray bar.

DETAILED DESCRIPTION OF EMBODIMENTS

Figure 1:
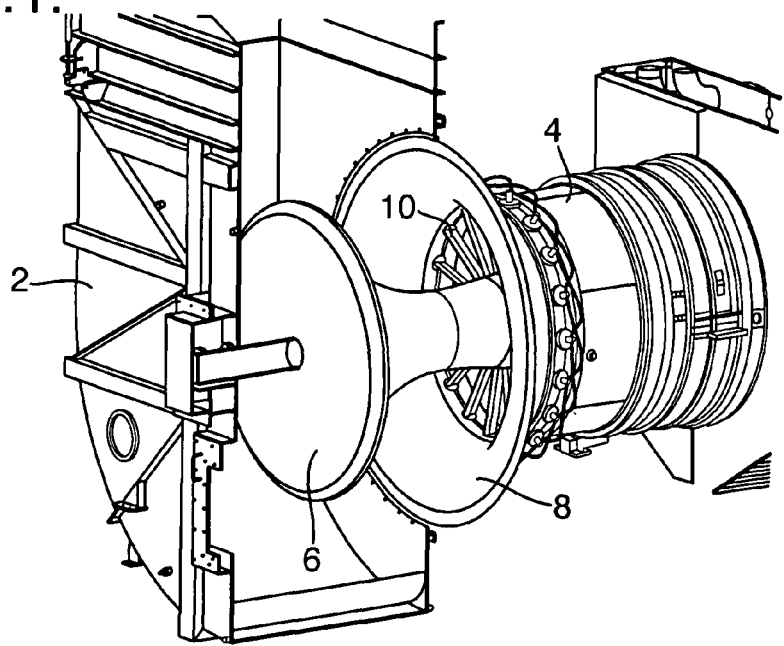
FIG. 1 depicts an industrial gas turbine incorporating a spray mechanism in accordance with the invention.

The industrial gas turbine depicted in FIG. 1 has an air inlet housing 2 which feeds air to an engine core which includes a compressor section 4 that compresses the fed air. The compressed air is subsequently passed to a combustor section and then to a turbine section. Fuel is added to the air stream in the combustion section and combusted. The hot combustion gasses are expanded in the turbine section to extract work which drives the compressors.

An inner flare 6 and outer flare 8 are provided to direct and smooth the flow of air into the compressor. Immediately before the flow of air enters the compressor it passes a spray bar arrangement 10, which is shown in more detail in FIG. 2.

Figure 2:
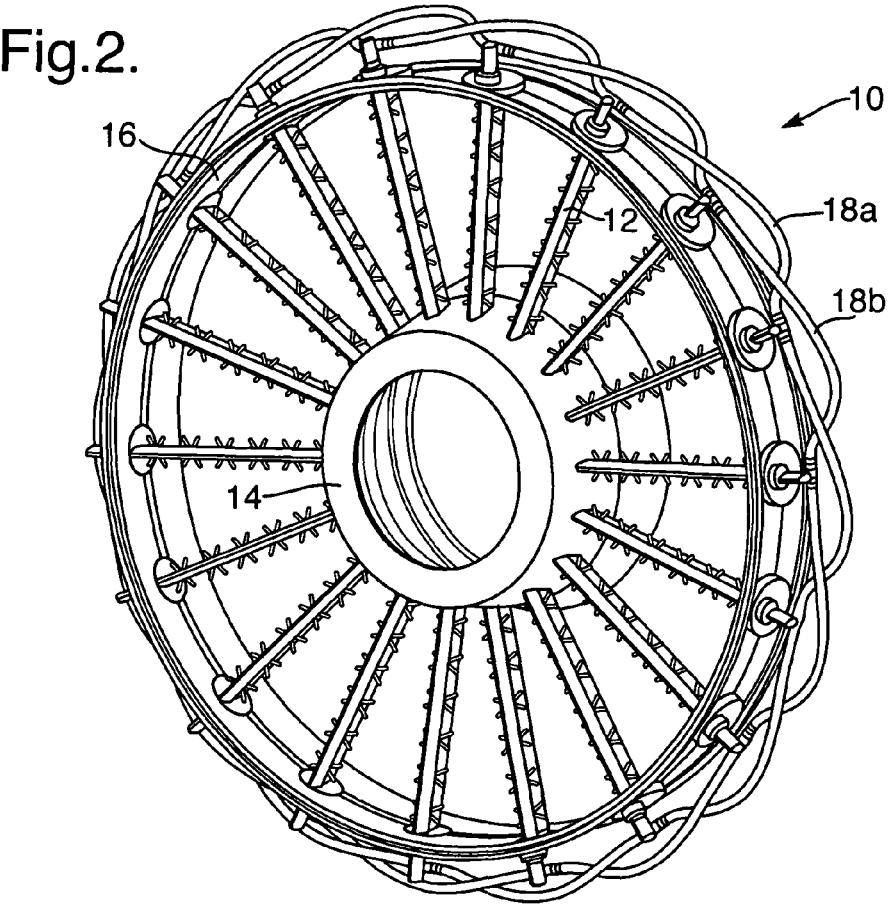
FIG. 2 depicts an array of water injection bars.

In the embodiment disclosed in FIG. 2, the spray bar arrangement 10 comprises eighteen spray bars 12 which extend radially between a hub 14 and a ring-shaped support 16 in a regularly spaced array. Each bar supports a number of spray elements 24 which are each provided with several spray nozzles 30.

The spray bar arrangement is a non-rotating component and each spray bar within the arrangement is profiled to provide an aerodynamic surface that does not create a significant disturbance in the air flow. The bars are connected to a fluid manifold, either manifold 18a or manifold 18b. Each manifold may be supplied with water independently of other manifolds to enable spray bars to supply water to the compressor independently of the remaining spray bars. Individual spray bars may be grouped with other bars to provide units which may be supplied with water selectively in stages. The volume of water supplied to the compressor can be controlled to a greater degree with such a staging arrangement and it will be appreciated that additional manifolds may be provided to further improve the staging capabilities of the fluid addition. Both manifolds may supply the same, or different fluids.

Figure 3:
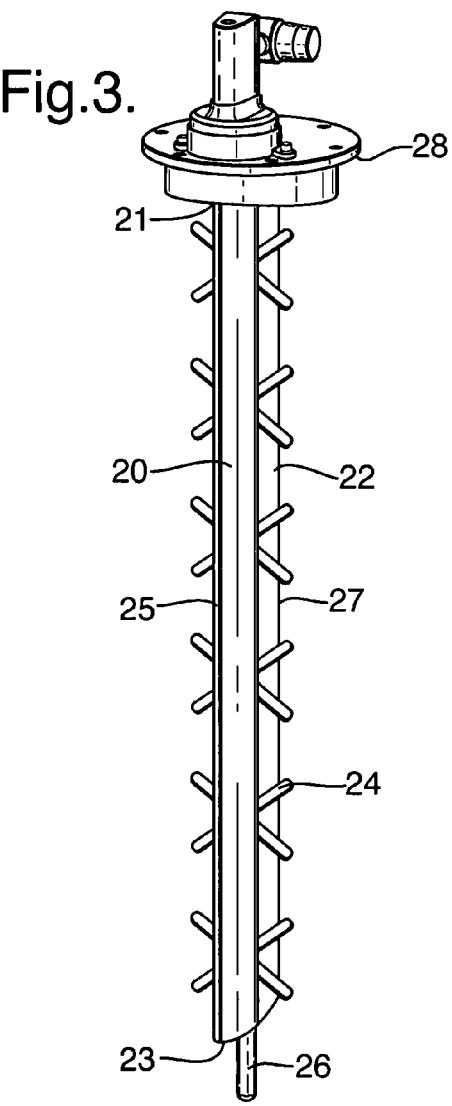
FIG. 3 depicts a spray bar.

A spray bar of the present embodiment is shown in greater detail in FIG. 3. The spray bar aerofoil has a radial length between a tip 21 and a foot 23 of 490 mm and a width between a leading edge 25 and a trailing edge 27 of 100 mm. Each bar is replaceable within the engine and is formed from a number of components which are similarly replaceable should conduits or nozzles become blocked or any other reason dictate their replacement.

A radially extending front fairing 22 is profiled to provide the leading edge 25. A radially extending rear fairing is profiled to provide a trailing edge 27. The front and rear fairings are connected together and support between them a plurality of spray elements 24 within which nozzles 30 are formed. A locating pin 26 is provided at the foot, or radially inner end 23 of the bar and a cap 28 at the radially outer end or tip 21. The locating pin 26 engages with a bush on the hub 14, whilst the cap 28 engages an aperture in the ring 16 when the spray bar is located within the engine.

Figure 4:
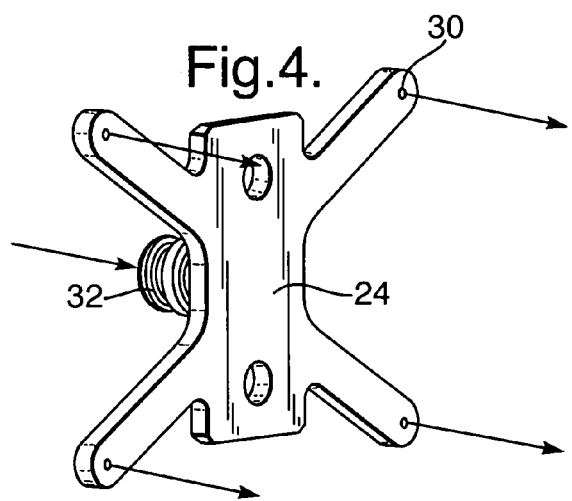
FIG. 4 depicts a spray bar element.

The spray elements are shown in greater detail in FIG. 4. Each spray element 24 has a plurality of arms that are provided with nozzles 30 at their end. The nozzles are directed towards the compressor to deliver a spray of water in a downstream direction. Water is supplied to the spray element via a fluid inlet 32 that engages with an aperture 48 provided in the front fairing of the spray bar. Grooves are provided within the outer surface of the inlet into which o-rings are mounted to minimise water leakage from a manifold in the front fairing in this embodiment but could be replaced by other sealing arrangements such as face seals or gaskets. The water inlet feeds a cavity within the spray element that divides the flow of water equally between the four nozzles 30. For the eighteen bar spray arrangement of the embodiment shown, with each bar having six spray elements with four nozzles each, four hundred and thirty two nozzles are provided in total which supply water to the compressor as a fine mist.

A front fairing is shown in FIG. 5. The fairing is initially formed as a profiled extrusion having an internal hollow bore 50 and lock surfaces 46, 44 towards the rear surface 42 of the component. The extruded fairing is machined to provide a series of flat mounting surfaces 47 at the rear of the component which are interleaved by locking portions 45 that contain the lock surfaces 44, 46.

Further machining is performed on the component to provide each mounting surface 47 with an aperture 48 that extends to the hollow bore 50 and a series of bolt holes 52 that are used to secure the spray elements in place.

The lock surfaces 44, 46 each has a radially extending valley of a generally "V" shaped cross-section.

The spray element is attached to the front fairing as shown in FIG. 6. The fluid inlet of the spray element is inserted into the aperture 48 and "O" rings provide a fluid tight seal preventing leakage. The nozzles 30 of the spray element are in fluid communication with the bore in the front fairing 20.

Bolts 54 are inserted through the spray element into the bolt holes 40 in the front fairing and are tightened to secure the spray element to the front fairing. It will be appreciated that once all the spray elements are attached it will be possible to supply water to the front fairing to an equivalent pressure to that used in operation and test operation of each spray element and nozzle. If any operate incorrectly it is a simple matter to remove and replace a defective spray element.

Figure 7:
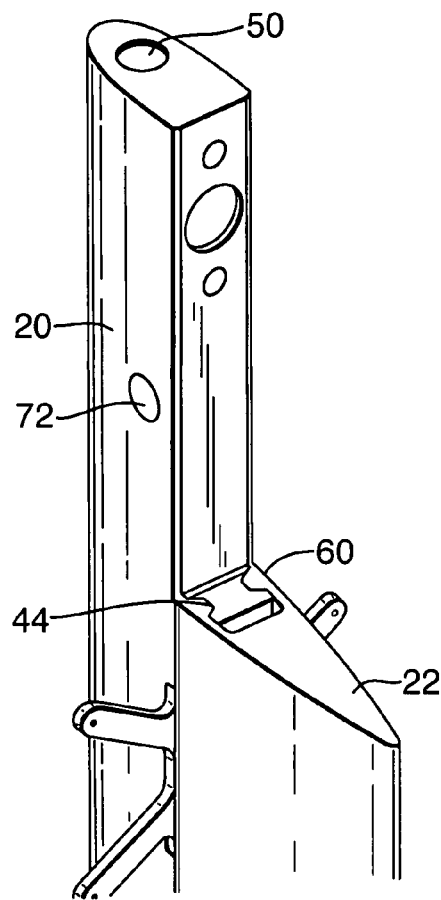
FIG. 7 shows attachment of a rear fairing to the front fairing.
Figure 8:
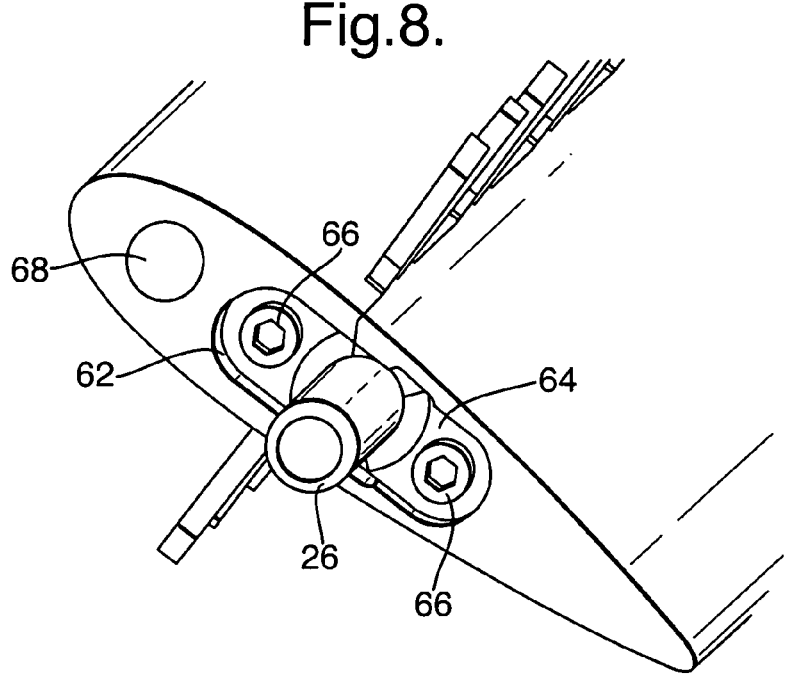
FIG. 8 depicts the bottom surface of the spray bar.

The heads of the bolts 54 do not extend beyond the plane of the rear surface 42 of the front fairing. However, it is desirable that the length the screw thread of the bolt extends into the front fairing is significantly greater than the distance between the outer face of the bolt head and the plane of the rear surface 42 of the front fairing. As depicted in FIG. 7 a rear fairing 22 is attached to the front fairing using the lock faces 44, 46 and complementary faces on the rear fairing. The bolt is therefore further secured against release by the rear fairing and is secured such that it cannot come loose to such an extent that it detaches from the front fairing.

It will be appreciated that a gas turbine engine comprises a number of parts that rotate at significant velocity. Ingress of foreign objects can cause great damage to the engine requiring high cost to repair. By ensuring the bolts and spray elements cannot work loose the risk of damage to the engine is mitigated.

The rear fairing is an extruded component having complementary radially extending engaging features which engage the lock faces 44, 46 of the front fairing. The rear fairing and the front fairing slide relative to each other and are secured in the desired relative location by a support plate 64 that is provided within a cavity 62 formed in the base between the front and rear fairings.

The support plate 64 has an integral locating pin 26 that is adapted to be inserted into a bush in the hub 14. The plate is secured to the front and rear fairings by bolts 66. A plug 68 is placed in the end of the hollow bore 50 to prevent leakage of water.

At the opposite end of the spray bar a cap 70 is provided that engages with apertures in the ring element 16. Initially, the cap is slid over the end of the fairings and a pin is inserted through the cap and the front fairing through aperture 72 thereby securing the cap in location. A rubber boot is slid over the end of the spray-bar to provide a seal between the front fairing and the cap and to prevent the pin from falling out. A clip 76 is secured to the cap 70 by bolts 78 to hold the boot and pin in position.

A manifold plate is secured to the front fairing to allow water to enter the hollow bore 50 through aperture 80. The top of the hollow bore 50 is closed by a weld or screw in blank 90.

The spray bar may be tested at this point by subjecting it to a pressure test. Any deficiencies or problems may be rectified by removal and replacement of a defective part before the bar is inserted into the engine.

To assemble the spray bar assembly 10 a jig is used to centre the hub 14 and ring 16 before the spray bars are attached. The spray bars are inserted from the outside of the ring towards the hub. The locating pin engages with a bush in the hub and the cap is bolted to the ring. Once complete the spray bar assembly is bolted to the compressor section of the gas turbine engine and the water supply manifolds 18*a*, 18*b* are attached.

Various modifications may be made without departing from the scope of the invention. For example, the aerofoil may provide turn to the flow of fluid into the compressor—acting as a guide-vane. Additionally, the aerofoil may be located elsewhere in the gas-turbine e.g. within the diffuser or pre-diffuser upstream of the compressor. Additionally, the spray bars may have applications in other industries where it is desirable to eject droplets of a fluid into a flow of a further fluid.

We claim:

1. An aerofoil spray assembly for a gas turbine engine, comprising:
    an aerofoil including a first part with a profile having a leading edge when located in the gas turbine engine, and a second part with a profile having a trailing edge when located in the gas turbine engine,
    wherein the first part has features that engage with complementary features on the second part, the features that engage of the first part being configured to slide relative to the complementary features of the second part to form a releasable arrangement; and
    a spray element that supplies water to an inlet of the gas turbine secured between the first and second parts.

2. The aerofoil spray assembly according to claim 1, wherein the features that engage of the first part provide at least one valley that extends parallel to the leading edge and the complementary features of the second part provide at least one projection that extends parallel to the trailing edge with the projection adapted to slide within the one valley.

3. The aerofoil spray assembly according to claim 1, wherein at least one of the first part and the second part has an internal bore for the passage of the water to the spray element.

4. The aerofoil spray assembly according to claim 3, wherein the spray element has a nozzle, the spray element providing a conduit for the water between the nozzle and the internal bore.

5. The aerofoil spray assembly according to claim 4, wherein the spray element has a plurality of arms, each arm protruding from an external surface of the aerofoil and having a nozzle at its extremity.

6. The aerofoil spray assembly according to claim 1, wherein the spray element is further secured to either the first or second part by mechanical means.

7. The aerofoil spray assembly according to claim 6, wherein the mechanical means is a bolt having a screw thread and which extends through an aperture in the spray element and which engages a corresponding screw thread in either the first or second part.

8. The aerofoil spray assembly according to claim 7, wherein the bolt has a greater length than a distance across a cavity formed between a rearward surface of the first part and a forward surface of the second part such that the bolt is prevented from unscrewing from the first or second part.

9. A gas turbine engine having the aerofoil spray assembly according to claim 1.

10. The gas turbine engine according to claim 9, further comprising a compressor, wherein the aerofoil spray assembly is located upstream of the compressor in the gas turbine engine.

11. The gas turbine engine according to claim 9, wherein the gas turbine engine comprises a spray module having an array of radially extending aerofoil spray assemblies.

12. The gas turbine engine according to claim 11, wherein the spray module comprises at least one fluid manifold for the supply of the water to the aerofoil spray assemblies.

13. The gas turbine engine according to claim 11, wherein each of the aerofoil spray assemblies is connected to one fluid manifold with the or each manifold being individually controllable for the staged supply of the water to the corresponding spray assembly.

14. An aerofoil spray assembly for a gas turbine engine, comprising:
   an aerofoil including a first part with a profile having a leading edge when located in a gas turbine engine, and a second part with a profile having a trailing edge when located in a gas turbine engine,
   wherein the first part has features that engage with complementary features on the second part to form a releasable arrangement; and
   a spray element, that supplies a liquid to the gas turbine, secured between the first and second parts, the spray element having a plurality of arms, each arm protruding from an external surface of the aerofoil and each arm having a nozzle at an extremity thereof.

15. The aerofoil spray assembly according to claim 14, further comprising a plurality of spray elements spaced along the length of the aerofoil, wherein the first part has a rearward surface having an array of locking portions, and a spray element is interleaved between adjacent locking portions.

16. The aerofoil spray assembly according to claim 15, wherein each locking portion has a valley into which the complementary features on the second part engage to provide a slidable arrangement.

17. The aerofoil spray assembly according to claim 15, wherein at least one of the first and second part has an internal bore for the passage of the fluid to each spray element.

18. The aerofoil spray assembly according to claim 14, wherein the spray element is further secured to either the first or second part by mechanical means.

19. A gas turbine engine comprising an aerofoil spray assembly according to claim 14.

20. The gas turbine engine according to claim 19, further comprising a compressor, wherein the aerofoil spray assembly is located upstream of the compressor in the gas turbine engine.

21. The gas turbine engine according to claim 19, further comprising a spray module having an array of radially extending aerofoil spray assemblies.

22. The gas turbine engine according to claim 11, wherein the spray module has at least one fluid manifold containing water for the supply of water to the aerofoil spray assembly.

* * * * *